United States Patent
Moy et al.

(10) Patent No.: US 11,544,788 B1
(45) Date of Patent: Jan. 3, 2023

(54) SYSTEMS AND METHODS FOR TOKENIZATION, MANAGEMENT, TRADING, SETTLEMENT, AND RETIREMENT OF RENEWABLE ENERGY ATTRIBUTES

(71) Applicant: JPMORGAN CHASE BANK, N.A., New York, NY (US)

(72) Inventors: Christine Moy, New York, NY (US); Tyrone Lobban, London (GB); Alec Saltikoff, New York, NY (US); Keerthi Moudgal, Brooklyn, NY (US); Stuart Hunter, New York, NY (US)

(73) Assignee: JPMORGAN CHASE BANK, N.A., New York, NY (US)

( * ) Notice: Subject to any disclaimer, the term of this patent is extended or adjusted under 35 U.S.C. 154(b) by 51 days.

(21) Appl. No.: 17/087,332

(22) Filed: Nov. 2, 2020

Related U.S. Application Data

(60) Provisional application No. 62/929,495, filed on Nov. 1, 2019.

(51) Int. Cl.
 *G06Q 40/04* (2012.01)
 *G06F 16/27* (2019.01)
 (Continued)

(52) U.S. Cl.
 CPC ............. *G06Q 40/04* (2013.01); *G06F 16/27* (2019.01); *G06Q 20/0655* (2013.01);
 (Continued)

(58) Field of Classification Search
 CPC .... G06Q 30/016; G06Q 10/10; G06Q 20/108; G06Q 40/04; G06Q 20/0655;
 (Continued)

(56) References Cited

U.S. PATENT DOCUMENTS

| 2019/0057396 A1* | 2/2019 | Cui ...................... G06Q 30/018 |
| 2019/0108516 A1* | 4/2019 | Jawaharlal ......... G06Q 20/3674 |

(Continued)

FOREIGN PATENT DOCUMENTS

| JP | 2019175416 A * | 10/2019 | ......... G01N 33/0032 |
| JP | 6811220 B2 * | 1/2021 | ......... G01N 33/0032 |

(Continued)

OTHER PUBLICATIONS

"Establishing a Secure, Transparent, and Autonomous Blockchain of Custody for Renewable Energy Credits and Carbon Credits," by Michael J. Ashley and Mark S. Johnson. IEEE Engineering Management Review. vol. 46, No. 4. Fourth Quarter, Dec. 2018. (Year: 2018).*

(Continued)

*Primary Examiner* — Sara C Hamilton
(74) *Attorney, Agent, or Firm* — Greenberg Traurig LLP

(57) ABSTRACT

Systems and methods for tokenization, management, trading, settlement, and retirement of renewable energy attributes are disclosed. In one embodiment, in an information processing apparatus comprising at least one computer processor, a method for tokenization, management, trading, settlement, and retirement of renewable energy attributes may include: (1) identifying renewable energy generation data associated with a seller to tokenize; (2) generating at least one renewable energy token for the identified renewable energy generation data; (3) writing the renewable energy token to a first distributed ledger; (4) adding the renewable energy token to a digital wallet for the seller; (5) exchanging the renewable energy token for a cash token owned by a buyer by associating the renewable energy token with the buyer and associating the cash token with the seller on the first distributed ledger; and (6) retiring the renewable energy token.

8 Claims, 2 Drawing Sheets

(51) Int. Cl.
  *G06Q 20/36* (2012.01)
  *G06Q 20/06* (2012.01)
  *G06Q 50/06* (2012.01)
  *G06Q 20/38* (2012.01)

(52) U.S. Cl.
  CPC ..... *G06Q 20/3672* (2013.01); *G06Q 20/3674* (2013.01); *G06Q 20/389* (2013.01); *G06Q 50/06* (2013.01)

(58) Field of Classification Search
  CPC .......... G06Q 20/3672; G06Q 20/3674; G06Q 20/389; G06Q 50/06; G06F 16/2246; G06F 16/27
  USPC ...................................................... 705/42, 37
  See application file for complete search history.

(56) References Cited

U.S. PATENT DOCUMENTS

| | | | | |
|---|---|---|---|---|
| 2019/0164236 | A1* | 5/2019 | Mayne | G06Q 20/389 |
| 2019/0197635 | A1* | 6/2019 | Kim | G06Q 20/308 |
| 2020/0027096 | A1* | 1/2020 | Cooner | G06Q 40/04 |
| 2020/0051186 | A1* | 2/2020 | Sarker | G07F 15/003 |
| 2020/0111105 | A1* | 4/2020 | Gupta | G06Q 20/065 |
| 2020/0148072 | A1* | 5/2020 | Ashley | G06Q 50/06 |
| 2021/0098988 | A1* | 4/2021 | Gokhale | G06Q 50/06 |
| 2021/0314143 | A1* | 10/2021 | Conner | H04L 63/067 |
| 2022/0180374 | A1* | 6/2022 | Cooner | G06Q 40/04 |

FOREIGN PATENT DOCUMENTS

| | | | |
|---|---|---|---|
| KR | 20210041456 A | * | 4/2021 |
| KR | 20210041457 A | * | 4/2021 |

OTHER PUBLICATIONS

"Establishing a Secure, Transparent, and Autonomous Blockchain of Custody for Renewable Energy Credits and Carbon Credits," by Michael J. Ashley and M S. Johnson. In IEEE Engineering Management Review. vol. 46, No. 4. pp. 100-102. Dec. 2018. (Year: 2018).*

"Blockchain technology in the energy sector: A systemic review of challenges and opportunities," by M. Andoni; V. Robu; David Flynn; S. Abram; D. Geach; D. Jenkins; P. McCallum; and A. Peacock. Renewable and Sustainable energy reviews, 100. Feb. 1, 2019. pp. 143-174. (Year: 2019).*

"A survey and evaluation of the potentials of distributed ledger technology for peer-to-peer transactive energy exchanges in local energy markets," by Pierluigi Siano; Giuseppe De Marco; Alejandro Rolan; and Vincenzo Loia. IEEE Systems Journal. Volume 13, No. 3. Mar. 20, 2019. pp. 3454-3466. (Year: 2019).*

"A blockchain-based peer-to-peer trading scheme coupling energy and carbon markets," by Weiqi Hua; and Hongjian Sun. In 2019 International conference on smart energy systems and technology (SEST). Sep. 9, 2019. pp. 1-6. IEEE. (Year: 2019).*

* cited by examiner

SYSTEMS AND METHODS FOR TOKENIZATION, MANAGEMENT, TRADING, SETTLEMENT, AND RETIREMENT OF RENEWABLE ENERGY ATTRIBUTES

RELATED APPLICATIONS

This application claims priority to, and the benefit of, U.S. Provisional Patent Application Ser. No. 62/929,495 filed Nov. 1, 2019, and is related to U.S. Provisional Patent Application Ser. No. 62/929,446 filed Nov. 1, 2019. The disclosures of each of these documents is hereby incorporated, by reference, in its entirety.

BACKGROUND OF THE INVENTION

1. Field of the Invention

Embodiments generally relate to systems and methods for tokenization, management, trading, settlement, and retirement of renewable energy attributes.

2. Description of the Related Art

Many governments, municipalities, and commercial entities are placing greater scrutiny on renewable energy generation data, leading to entities not receiving credit for their generation of renewable energy. For example, in order to receive Renewable Energy Credits (REC), the RECs must be certified and retired.

SUMMARY OF THE INVENTION

Systems and methods for tokenization, management, trading, settlement, and retirement of renewable energy attributes are disclosed. In one embodiment, in an information processing apparatus comprising at least one computer processor, a method for tokenization, management, trading, settlement, and retirement of renewable energy attributes may include: (1) identifying renewable energy generation data associated with a seller to tokenize; (2) generating at least one renewable energy token for the identified renewable energy generation data; (3) writing the renewable energy token to a first distributed ledger; (4) adding the renewable energy token to a digital wallet for the seller; (5) exchanging the renewable energy token for a cash token owned by a buyer by associating the renewable energy token with the buyer and associating the cash token with the seller on the first distributed ledger; and (6) retiring the renewable energy token.

In one embodiment, the renewable energy token may be generated for a fixed amount of generated renewable energy, for a variable amount of generated renewable energy, etc.

In one embodiment, the renewable energy generation data may be written to a second distributed ledger.

In one embodiment, the first distributed ledger and the second distributed ledger may be the same.

In one embodiment, the step of retiring the renewable energy token may include adding the renewable energy token to a list of retired renewable energy tokens, or removing the renewable energy token from a list of active renewable energy tokens, writing the expiration of the renewable energy token to the first distributed ledger, etc.

In one embodiment, the step of exchanging the renewable energy token for a cash token owned by a buyer by associating the renewable energy token with the buyer and associating the cash token with the seller on the first distributed ledger may include verifying that the renewable energy token and the cash token are valid.

According to another embodiment, a system for tokenization, management, trading, settlement, and retirement of renewable energy attributes may include a selling entity comprising a selling entity information processing apparatus selling a renewable energy credit; a buying entity comprising a buying information processing apparatus buying the renewable energy credit; and a first distributed ledger system in which the selling entity and the buying entity are participate as nodes in the distributed ledger network. The selling entity information processing apparatus may generate at least one renewable energy token for the renewable energy generation data and may write the renewable energy token to a first distributed ledger. The first distributed ledger system may add the renewable energy token to a digital wallet for the selling entity, my exchange the renewable energy token for a cash token owned by the buying entity by associating the renewable energy token with the buying entity and associating the cash token with the selling entity on the first distributed ledger system, and may retire the renewable energy token.

In one embodiment, the renewable energy token may be generated for a fixed amount of generated renewable energy, a variable amount of generated renewable energy, etc.

In one embodiment, the system may further include a second distributed ledger system, and the renewable energy generation data may be written to the second distributed ledger system.

In one embodiment, the first distributed ledger and the second distributed ledger are the same.

In one embodiment, the first distributed ledger system may retire the renewable energy token retires the renewable energy token by adding the renewable energy token to a list of retired renewable energy tokens, or by removing the renewable energy token from a list of active renewable energy tokens. In another embodiment, the first distributed ledger system may retires the renewable energy token may retire the renewable energy token by writing the expiration of the renewable energy token to the first distributed ledger system.

In one embodiment, the first distributed ledger system may exchange the renewable energy token for a cash token owned by the buying entity by associating the renewable energy token with the buying entity and associating the cash token with the seller on the first distributed ledger comprising verifying that the renewable energy token and the cash token are valid.

BRIEF DESCRIPTION OF THE DRAWINGS

In order to facilitate a fuller understanding of the present invention, reference is now made to the attached drawings in which.

DETAILED DESCRIPTION OF PREFERRED EMBODIMENTS

Systems and methods for tokenization, management, trading, settlement, and retirement of renewable energy attributes are disclosed.

Figure 1:
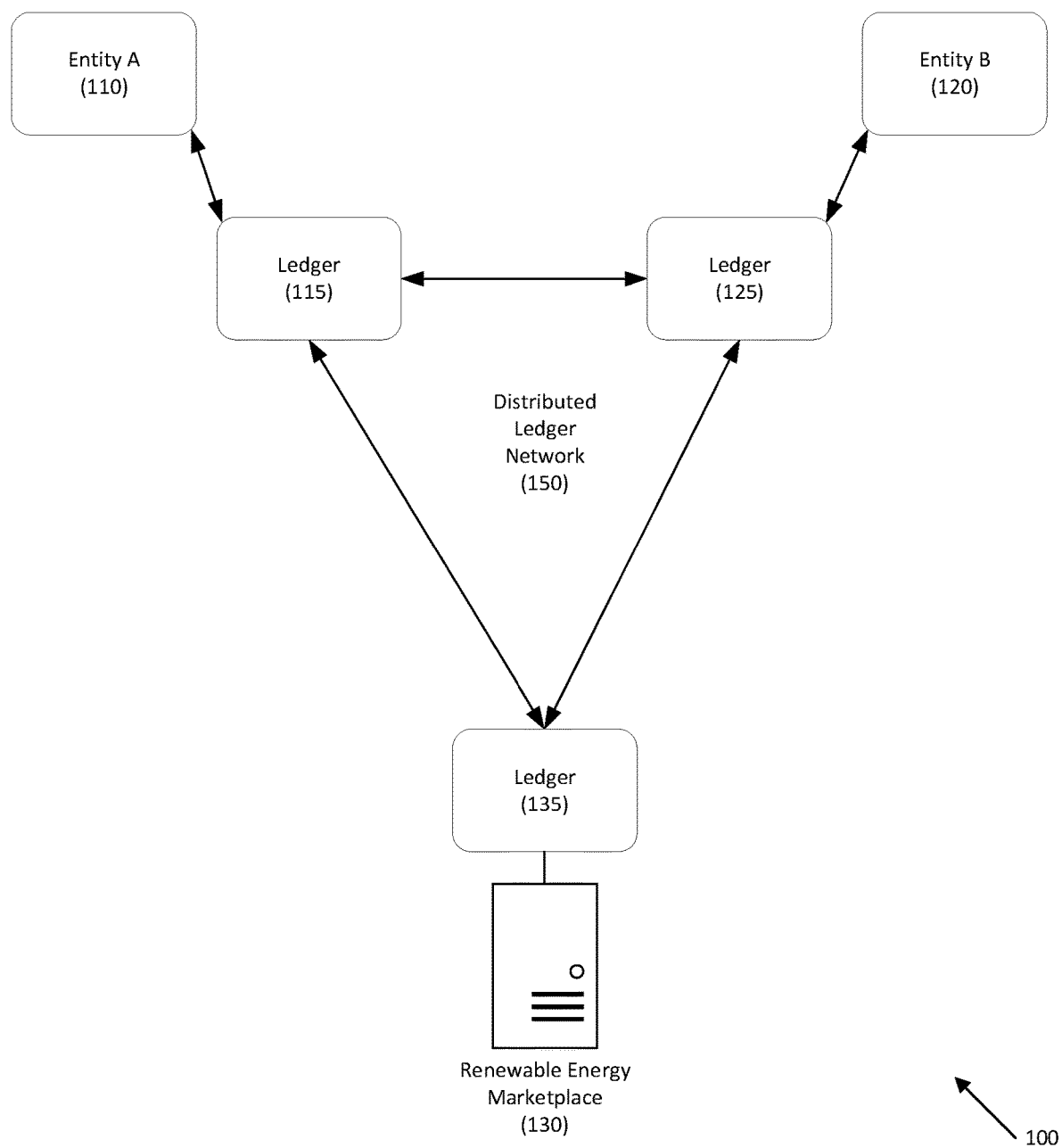
FIG. 1 discloses a system for tokenization, management, trading, settlement, and retirement of renewable energy attributes according to one embodiment.

Referring to FIG. 1, a system for tokenization, management, trading, settlement, and retirement of renewable energy attributes is disclosed according to one embodiment. System 100 may include a plurality of entities, such as entity A 110 and entity B 120. In one embodiment, each entity may manage renewable energy credits and may control a renewable energy generator, such as solar panels, wind turbines, fuel cells, etc.

It should be understood that although only two entities are depicted in FIG. 1, a greater number of entities may be provided as is necessary and/or desired.

Each entity 110, 120 may participate in distributed ledger network 150 and may access its respective copy of the distributed ledger (e.g., ledger 115, ledger 125) through a node or API. Entities may further include certification agents or auditors who could validate energy generation information and renewal energy attributes in real time, via the provably immutable distributed ledger.

System 100 may further include renewable energy marketplace 130 that may participate as a node in the distributed ledger network using ledger 135. Renewable energy marketplace 130 may provide access to non-node participants in the distributed ledger network using, for example, APIs.

Renewable energy marketplace 130 may facilitate the purchase, sale, and/or exchange of tokens representing renewable energy, such as Renewable Energy Credits (RECs) that are written to distributed ledger network 150. In one embodiment, distributed ledger network 150 may include a separate distributed ledger network (not shown) that may be used to record renewable energy generated by renewable energy generators that may be associated with the one of the entities.

Figure 2:
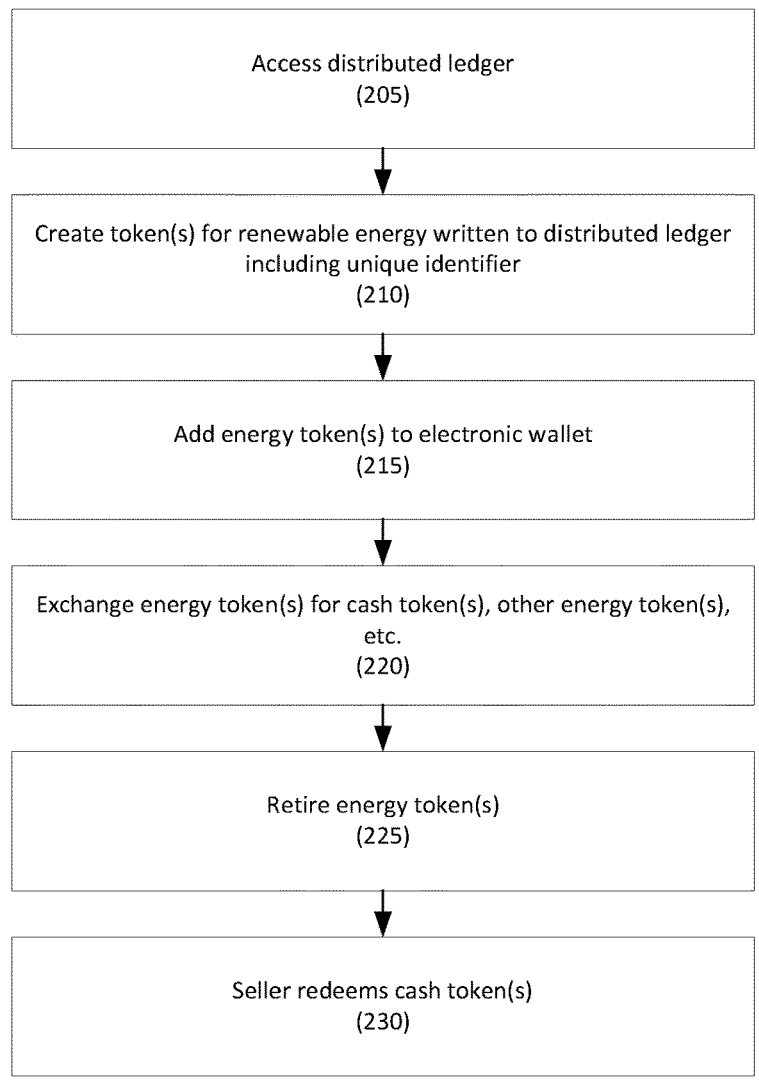
FIG. 2 depicts a method for tokenization, management, trading, settlement, and retirement of renewable energy attributes according to one embodiment.

Referring to FIG. 2, a method for tokenization, management, trading, settlement, and retirement of renewable energy attributes is disclosed according to one embodiment.

In step 205, an entity may access a distributed ledger or other immutable, verifiable storage system to identify stored renewal energy generation data. In one embodiment, the entity may have rights to some of the renewal energy that is represented on the distributed ledger. For example, the entity may own or control the renewable energy generator, own or control a building associated with the renewable energy generator, etc.

In another embodiment, the entity may be a service provider, a broker, etc.

In step 210, the system may tokenize or digitize the renewal energy written to the distributed ledger. For example, the generation of a unit of energy may be recorded to the distributed ledger, in non-fungible form, which may then output a unique identifier, such as a hash. The system may identify one or more hashes that resides within one or more blocks and may combine the unique energy data identifiers into a single token that can then be traded, exchanged or retired. The system may write the token to the same distributed ledger, or to another distributed ledger. This may output a unique identifier, or hash specific to that token.

In one embodiment, the energy token may include attributes such as the location at which the renewable energy was generated, the amount of energy produced, the device ID of the device that generated or output the energy, a carbon offset amount, whether any of the attributes have been claimed, environmental data, weather data, etc.

In one embodiment, the energy tokens may be inextricably linked to their associated energy-unit records on the distributed ledger that maintains renewable energy production records, such that it can be easily and provably determined that the energy tokens are definitively and sufficiently backed by energy that has been produced from renewable sources.

In one embodiment, as part of the token generation process, the system may confirm that a digital signature on the energy-unit's attribution payload matches that of the system that is the source of the energy units. It may then verify whether the attribution is data-complete and otherwise valid. Additionally, it may verify that the renewable energy record has not already been recorded, thus preventing the double counting of energy. Various static metadata, including identifying information about the system or facility, may also be included along with the energy and carbon offset values.

In one embodiment, the distributed ledger may provide permissioned access to energy tokens that the entity may hold.

In one embodiment, the energy token may represent the amount of renewable energy recorded in one or more blocks, and may be in any suitable denomination. For example, a single energy token may represent 1 mWh (which is redeemable for one renewable energy credit); however, any suitable denomination may be used, including fractions of a mWh.

In step 215, the energy token(s) or partial energy tokens may be added to a digital wallet for the entity. In one embodiment, the digital wallet may be maintained on the same distributed ledger, or a different distributed ledger.

In step 220, the entity may exchange the energy token(s) in a digital marketplace for tokenized cash, cryptocurrency, etc. For example, the entity may buy energy tokens, sell energy tokens, trade energy tokens, or may redeem energy tokens. Each transaction involving the energy token(s) may be written to a distributed ledger, and the relationship between the unique identifier for the renewable energy is maintained.

The disclosures of U.S. Provisional Patent Application Ser. Nos. 62/446,185; 15/869,421; 62/757,614; and Ser. No. 16/040,696; and 16/653,369 are hereby incorporated, by reference, in their entireties.

In one embodiment, additional checks, such as verifying that the energy tokens have not been retired, may be performed before the energy token(s) may be exchanged. For example, a list of active tokens (e.g., a whitelist), a list of retired tokens (e.g., a blacklist), an entry on the distributed ledger or on a separate distributed ledger, etc. may be checked.

In step 225, after the energy tokens are exchanged, an owner of an energy token may retire the token. In one embodiment, the attributes associated with the retired energy token, such as the energy produced, carbon offset, etc. may be locked so that they may not be used or traded again. Thus, attributes and energy token usage cannot be double counted.

In one embodiment, the energy token may be retired by writing it to a list of retired energy tokens (e.g., a blacklist). In another embodiment, energy token may be retired by removing it from a list of active energy tokens (e.g., a whitelist). Any other suitable mechanism for retiring the energy token so that it cannot be used again may be implemented as is necessary and/or desired.

In step 230, the seller may redeem the cash tokens for fiat cash, cryptocurrency, etc.

When accessing the marketplace, entities may set a price and quantity for the number of units of a particular type of token (e.g., renewable energy credit, carbon offset, or other) that they want to buy or sell. Other entities may see those offers and place bids for them. Trading may take place in a peer-to-peer fashion, with any ownership changes being recorded on the distributed ledger.

Buyers of the tokens may validate that the energy token is backed by the required amount of energy and that that energy has been recorded once and once only from a validated, authenticated source. The buyer may also validate this information independent of the system through, for example, a block explorer. The buyer may also validate that the energy token has not been retired or sold to another party.

Energy tokens may be exchanged for tokenized fiat cash to ensure automatic and atomic settlement of energy assets for cash. This may take place once a buyer has placed a bid for an energy token and the seller has accepted that bid, or it may take place at a later point once both sides of the trade have been satisfied.

Hereinafter, general aspects of implementation of the systems and methods of the invention will be described.

The system of the invention or portions of the system of the invention may be in the form of a "processing machine," such as a general-purpose computer, for example. As used herein, the term "processing machine" is to be understood to include at least one processor that uses at least one memory. The at least one memory stores a set of instructions. The instructions may be either permanently or temporarily stored in the memory or memories of the processing machine. The processor executes the instructions that are stored in the memory or memories in order to process data. The set of instructions may include various instructions that perform a particular task or tasks, such as those tasks described above. Such a set of instructions for performing a particular task may be characterized as a program, software program, or simply software.

In one embodiment, the processing machine may be a specialized processor.

As noted above, the processing machine executes the instructions that are stored in the memory or memories to process data. This processing of data may be in response to commands by a user or users of the processing machine, in response to previous processing, in response to a request by another processing machine and/or any other input, for example.

As noted above, the processing machine used to implement the invention may be a general-purpose computer. However, the processing machine described above may also utilize any of a wide variety of other technologies including a special purpose computer, a computer system including, for example, a microcomputer, mini-computer or mainframe, a programmed microprocessor, a micro-controller, a peripheral integrated circuit element, a CSIC (Customer Specific Integrated Circuit) or ASIC (Application Specific Integrated Circuit) or other integrated circuit, a logic circuit, a digital signal processor, a programmable logic device such as a FPGA, PLD, PLA or PAL, or any other device or arrangement of devices that is capable of implementing the steps of the processes of the invention.

The processing machine used to implement the invention may utilize a suitable operating system. Thus, embodiments of the invention may include a processing machine running the iOS operating system, the OS X operating system, the Android operating system, the Microsoft Windows™ operating systems, the Unix operating system, the Linux operating system, the Xenix operating system, the IBM AIX™ operating system, the Hewlett-Packard UX™ operating system, the Novell Netware™ operating system, the Sun Microsystems Solaris™ operating system, the OS/2™ operating system, the BeOS™ operating system, the Macintosh operating system, the Apache operating system, an OpenStep™ operating system or another operating system or platform.

It is appreciated that in order to practice the method of the invention as described above, it is not necessary that the processors and/or the memories of the processing machine be physically located in the same geographical place. That is, each of the processors and the memories used by the processing machine may be located in geographically distinct locations and connected so as to communicate in any suitable manner. Additionally, it is appreciated that each of the processor and/or the memory may be composed of different physical pieces of equipment. Accordingly, it is not necessary that the processor be one single piece of equipment in one location and that the memory be another single piece of equipment in another location. That is, it is contemplated that the processor may be two pieces of equipment in two different physical locations. The two distinct pieces of equipment may be connected in any suitable manner. Additionally, the memory may include two or more portions of memory in two or more physical locations.

To explain further, processing, as described above, is performed by various components and various memories. However, it is appreciated that the processing performed by two distinct components as described above may, in accordance with a further embodiment of the invention, be performed by a single component. Further, the processing performed by one distinct component as described above may be performed by two distinct components. In a similar manner, the memory storage performed by two distinct memory portions as described above may, in accordance with a further embodiment of the invention, be performed by a single memory portion. Further, the memory storage performed by one distinct memory portion as described above may be performed by two memory portions.

Further, various technologies may be used to provide communication between the various processors and/or memories, as well as to allow the processors and/or the memories of the invention to communicate with any other entity; i.e., so as to obtain further instructions or to access and use remote memory stores, for example. Such technologies used to provide such communication might include a network, the Internet, Intranet, Extranet, LAN, an Ethernet, wireless communication via cell tower or satellite, or any client server system that provides communication, for example. Such communications technologies may use any suitable protocol such as TCP/IP, UDP, or OSI, for example.

As described above, a set of instructions may be used in the processing of the invention. The set of instructions may be in the form of a program or software. The software may be in the form of system software or application software, for example. The software might also be in the form of a collection of separate programs, a program module within a larger program, or a portion of a program module, for example. The software used might also include modular programming in the form of object oriented programming. The software tells the processing machine what to do with the data being processed.

Further, it is appreciated that the instructions or set of instructions used in the implementation and operation of the invention may be in a suitable form such that the processing machine may read the instructions. For example, the instructions that form a program may be in the form of a suitable programming language, which is converted to machine language or object code to allow the processor or processors to read the instructions. That is, written lines of programming code or source code, in a particular programming language, are converted to machine language using a compiler, assembler or interpreter. The machine language is binary coded machine instructions that are specific to a particular type of processing machine, i.e., to a particular type of computer, for example. The computer understands the machine language.

Any suitable programming language may be used in accordance with the various embodiments of the invention. Illustratively, the programming language used may include assembly language, Ada, APL, Basic, C, C++, COBOL, dBase, Forth, Fortran, Java, Modula-2, Pascal, Prolog, REXX, Visual Basic, Solidity, and/or JavaScript, for example. Further, it is not necessary that a single type of instruction or single programming language be utilized in conjunction with the operation of the system and method of the invention. Rather, any number of different programming languages may be utilized as is necessary and/or desirable.

Also, the instructions and/or data used in the practice of the invention may utilize any compression or encryption technique or algorithm, as may be desired. An encryption module might be used to encrypt data. Further, files or other data may be decrypted using a suitable decryption module, for example.

As described above, the invention may illustratively be embodied in the form of a processing machine, including a computer or computer system, for example, that includes at least one memory. It is to be appreciated that the set of instructions, i.e., the software for example, that enables the computer operating system to perform the operations described above may be contained on any of a wide variety of media or medium, as desired. Further, the data that is processed by the set of instructions might also be contained on any of a wide variety of media or medium. That is, the particular medium, i.e., the memory in the processing machine, utilized to hold the set of instructions and/or the data used in the invention may take on any of a variety of physical forms or transmissions, for example. Illustratively, the medium may be in the form of paper, paper transparencies, a compact disk, a DVD, an integrated circuit, a hard disk, a floppy disk, an optical disk, a magnetic tape, a RAM, a ROM, a PROM, an EPROM, a wire, a cable, a fiber, a communications channel, a satellite transmission, a memory card, a SIM card, or other remote transmission, as well as any other medium or source of data that may be read by the processors of the invention.

Further, the memory or memories used in the processing machine that implements the invention may be in any of a wide variety of forms to allow the memory to hold instructions, data, or other information, as is desired. Thus, the memory might be in the form of a database to hold data. The database might use any desired arrangement of files such as a flat file arrangement or a relational database arrangement, for example.

In the system and method of the invention, a variety of "user interfaces" may be utilized to allow a user to interface with the processing machine or machines that are used to implement the invention. As used herein, a user interface includes any hardware, software, or combination of hardware and software used by the processing machine that allows a user to interact with the processing machine. A user interface may be in the form of a dialogue screen for example. A user interface may also include any of a mouse, touch screen, keyboard, keypad, voice reader, voice recognizer, dialogue screen, menu box, list, checkbox, toggle switch, a pushbutton or any other device that allows a user to receive information regarding the operation of the processing machine as it processes a set of instructions and/or provides the processing machine with information. Accordingly, the user interface is any device that provides communication between a user and a processing machine. The information provided by the user to the processing machine through the user interface may be in the form of a command, a selection of data, or some other input, for example.

As discussed above, a user interface is utilized by the processing machine that performs a set of instructions such that the processing machine processes data for a user. The user interface is typically used by the processing machine for interacting with a user either to convey information or receive information from the user. However, it should be appreciated that in accordance with some embodiments of the system and method of the invention, it is not necessary that a human user actually interact with a user interface used by the processing machine of the invention. Rather, it is also contemplated that the user interface of the invention might interact, i.e., convey and receive information, with another processing machine, rather than a human user. Accordingly, the other processing machine might be characterized as a user. Further, it is contemplated that a user interface utilized in the system and method of the invention may interact partially with another processing machine or processing machines, while also interacting partially with a human user.

It will be readily understood by those persons skilled in the art that the present invention is susceptible to broad utility and application. Many embodiments and adaptations of the present invention other than those herein described, as well as many variations, modifications and equivalent arrangements, will be apparent from or reasonably suggested by the present invention and foregoing description thereof, without departing from the substance or scope of the invention.

Accordingly, while the present invention has been described here in detail in relation to its exemplary embodiments, it is to be understood that this disclosure is only illustrative and exemplary of the present invention and is made to provide an enabling disclosure of the invention. Accordingly, the foregoing disclosure is not intended to be construed or to limit the present invention or otherwise to exclude any other such embodiments, adaptations, variations, modifications or equivalent arrangements.

What is claimed is:

1. A system for tokenization, management, trading, settlement, and retirement of renewable energy attributes comprising:
    a selling entity comprising a selling entity information processing apparatus configured to sell a renewable energy credit;
    a buying entity comprising a buying information processing apparatus configured to buy the renewable energy credit; and
    a first distributed ledger system in which the selling entity and the buying entity participate as nodes in a distributed ledger network;
    wherein:
        the selling entity information processing apparatus is further configured to:
            generate at least one renewable energy token for renewable energy generation data; and
            write the renewable energy token to a first distributed ledger; and the first distributed ledger system is further configured to:

add the renewable energy token to a digital wallet for the selling entity;

verify the renewable energy token by determining that the renewable energy token is not on a list of retired renewable energy tokens;

in response to the verification, exchange the renewable energy token for a cash token owned by the buying entity by associating the renewable energy token with the buying entity and associating the cash token with the selling entity on the first distributed ledger system; and retire the renewable energy token.

2. The system of claim 1, wherein the renewable energy token is generated for a fixed amount of generated renewable energy.

3. The system of claim 1, wherein the renewable energy token is generated for a variable amount of generated renewable energy.

4. The system of claim 1, further comprising a second distributed ledger system, wherein the renewable energy generation data is written to a second distributed ledger system.

5. The system of claim 4, wherein the first distributed ledger and the second distributed ledger are the same.

6. The system of claim 1, wherein the first distributed ledger system is further configured to:

retire the renewable energy token by adding the renewable energy token to the list of retired renewable energy tokens, or removing the renewable energy token from a list of active renewable energy tokens.

7. The system of claim 1, wherein the first distributed ledger system is further configured to:

retire the renewable energy token by writing the expiration of the renewable energy token to the first distributed ledger system.

8. The system of claim 1, wherein the first distributed ledger system is further configured to:

confirm the renewable energy token by comparing a digital signature on the renewable energy token to a digital signature of the selling entity.

* * * * *